United States Patent Office 3,705,128
Patented Dec. 5, 1972

3,705,128
FLAME RESISTANT POLYMERS CONTAINING AMIDE COMPLEXES OF METAL SALTS
Richard N. Knowles, Hockessin, Del., assignor to E. I. du Pont de Nemours and Company, Wilmington, Del.
No Drawing. Filed July 23, 1971, Ser. No. 165,717
Int. Cl. C08f 45/60, 45/62; C08g 51/60, 51/62
U.S. Cl. 260—45.75 R                10 Claims

ABSTRACT OF THE DISCLOSURE

Flame resistant polymers, such as halogenated polyesters and polyvinyl chloride containing amide complexes of certain metal salts such as zinc chloride-dimethyl formamide, and articles such as molded bodies, films, etc. of such flame resistant polymers.

BACKGROUND OF THE INVENTION

Complexes of various metal salts with amides are reported by S. J. Kuhn et al., Canadian J. Chemistry, 43, 375 (1965), by M. A. J. Jungbauer et al., Nature, 202, 290 (1964), by M. Glavas et al., J. Inorganic and Nuclear Chemistry, 31, 291 (1969), and by W. E. Bull et al., Inorganic Chemistry, 2, 303 (1963). Spectroscopic, thermal, and electrochemical data were developed to help elucidate the structure of these complexes. British Pat. 774,956 discloses iron salt complexes with a variety of amides for use as organic soluble carbonylation catalysts.

Antimony, tin and zinc oxides have been used as flame retardants in the presence of halogenated compounds. A number of borates, such as zinc borate, also are known flame retardants. These metal oxides and borates, however, are quite insoluble in most organic systems, producing pigmentation and opacity in articles containing them. Therefore, they are unsuitable for use where high levels of light transmission are required.

The halides of metals such as antimony, tin and zinc are also known to be flame retardants ("Modern Plastics," p. 102, September 1966). These salts, however, have a tendency to degrade many polymeric systems and thus their use as flame retardants is quite limited. For example, zinc chloride causes severe discoloration and loss of strength in halogenated polyesters.

SUMMARY OF INVENTION

This invention relates to flame resistant polymers containing amide complexes of certain metal salts in an amount to impart flame retardancy to the polymer. Preferred polymers are halogenated polyesters and polyvinyl chlorides. Articles formed from such flame resistant polymers have greater clarity and strength than can be obtained when metal salts are used alone to impart flame retardancy.

As a means of incorporating the amide complexes into the polymer, the complexes can be dispersed as a solid in the molten polymer or prepolymer or they can be dissolved with the polymer or prepolymer in a mutual solvent. In general, the level of amide complex in the polymer will range from 0.5 to 30% by weight. The amide complexes can be used with other flame retardants such as phosphorous and antimony compounds.

DETAILED DESCRIPTION OF INVENTION

The complexes useful for purposes of the invention can be illustrated by the following formula:

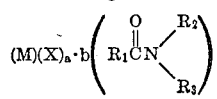

where
M is boron, aluminum, iron, zinc, lead, tin or antimony;
X is chlorine, bromine, or iodine;
$a$ is an integer in the range of from 2–5 such that the salt MX is neutral;
$R_1$ is hydrogen, alkyl of 1–3 carbon atoms, or

wherein $R_4$ is hydrogen or alkyl of 1–3 carbon atoms and $R_5$ is hydrogen, alkyl of 1–3 carbon atoms, phenyl, bromo or chlorosubstituted phenyl;
$R_2$ and $R_3$ are each hydrogen or alkyl of 1–3 carbon atoms; and
$b$ is 1 or 2;

with the proviso that $R_1$ and $R_3$ can be joined together to form the group —$(CH_2)_n$— wherein $n=3$–4 and with the further proviso that $R_2$ and $R_3$ can be joined together to form the group —$(CH_2)_n$— wherein $n=2$–5 or can be taken together with the nitrogen atom (N) to form a morpholino group.

Exemplary of the complexes useful for the invention are those listed below. In this listing and throughout the specification the abbreviations DMF, DMAC, and NMP mean N,N-dimethylformamide, N,N-dimethylacetamide, and N-methylpyrrolidone, respectively.

$ZnCl_2 \cdot 2DMF$
$ZnCl_2 \cdot 2DMAC$
$ZnCl_2 \cdot 2NMP$
$SnCl_2 \cdot 1DMF$
$SbCl_3 \cdot 1DMF$
$BBr_3 \cdot 1DMF$
$BCl_3 \cdot 1DMF$
$AlCl_3 \cdot 1DMF$
$SnCl_4 \cdot 2DMF$
$SbCl_5 \cdot 1DMF$
$FeCl_3 \cdot 2DMF$
$ZnBr_2 \cdot 2DMF$
$ZnI_2 \cdot 2DMF$
$SnCl_4 \cdot 2DMF$
$SbCl_5 \cdot 1DMF$
$PbI_2 \cdot 1DMAC$
$ZnCl_2 \cdot 2$(N,N-dimethylpropionamide)
$ZnCl_2 \cdot 2$(N,N-diethylformamide)
$ZnCl_2 \cdot 2$(3,4-dichlorophenyl-1,1-dimethylurea)
$ZnCl_2 \cdot 2$(1-acetylpiperidine)
$ZnCl_2 \cdot 2$(1-formylmorpholine)
$ZnCl_2 \cdot 2$(1-formylpyrrolidine)
$ZnCl_2 \cdot 2$(3,4-dichlorophenyl-1,1-dimethylurea)
$ZnCl_2 \cdot 2$(4-chlorophenyl-1,1-dimethylurea)

The amide complexes of the invention can be prepared according to the methods of S. J. Kuhn et al., Canadian J. Chemistry, 43, 375 (1965), W. E. Bull et al., Inorganic Chemistry, 2, 303 (1963), and U.S. Pat. 3,297,425.

The preferred polymeric materials are halogenated polyesters and polyvinyl chloride. Examples of suitable halogenated polyesters are given in R.C. Nametz, Industrial and Engineering Chemistry, vol. 59 (1967), pages 99–116. Further examples of suitable halogenated polyesters are described in U.S. Pat. 2,810,712 and U.S. Pat. 3,536,781 which may be characterized as halogenated unsaturated polyesters derived from a halogenated unsaturated polycarboxylic acid and a polyol.

The term "polyvinyl chloride" as used herein is intended to include polymers and copolymers of vinyl chloride and compositions containing such a polymer or copolymers in combination with a plasticizing agent to increase the polymer or copolymer's workability or flexibility.

Examples of plasticizing agents can be found in Modern Plastics Encyclopedia, 1970–71, pages 856–867. The manner of using such plasticizers, the properties imparted by their use and the mechanism involved are reviewed in Encyclopedia of Polymer Science, 2nd edition, vol. 10, pages 228–306.

Other polymeric materials which can be made flame resistant with the amide complexes include polypropylene, polyvinylidene chloride, polymethylmethacrylate, polyesters, polyurethanes, polystyrene, styrene-acrylonitrile copolymers, epoxy resins, acrylonitrilebutadiene-styrene terpolymers, formaldehyde polymers, polycarbonates, polyvinyl alcohol, polyvinyl acetate, urea-formaldehyde polymers and phenol-formaldehyde polymers.

If the polymeric material does not inherently contain halogen, the amide complex should be added with a material which provides a source of halogen in order to give effective flame retardancy. The halogen source preferably is a highly chlorinated or brominated material, such as Chlorowax® 70 (a chlorinated hydrocarbon wax supplied by Diamond Shamrock Company) provided it is compatible with the particular polymer system in the proportions it is used.

In general, the amount of amide complex which is added to the polymeric material to impart flame retardancy will be in a range of from 0.5 to 30% by weight. Below 0.5% little improvement in flame retardancy is obtained. Above 30% added improvements in flame retardancy are small and the deterioration of other properties of the polymeric material is apt to occur. The preferred level of amide complex in the polymer is in the range of from 1 to 10% by weight.

The amide complexes can be incorporated into the polymer by mixing the dry powders with the powdered or melted polymer using any of the techniques currently used in the art for mixing antimony oxide or other solid pigment or filler with polymeric materials for extrusion or blow molding. Alternatively, the complexes can be dissolved with the polymeric material in a mutual solvent such as N,N-dimethylformamide.

If desired, the amide complexes can also be mixed with prepolymers prior to hot pressing and casting operations. Flame retarded, reinforced polyester panels having high light transmission can be produced this way.

As the molecular weight of the amide portion of the complex increases, the organic solubility of the complex increases. As the solubility increases, the light transmission of polymeric materials containing the amide complex increases. The solubility of the complexes is sufficiently high in halogenated polyesters and polyvinyl chloride so that flame retardant articles can be made having a high degree of clarity.

The flame resistant polymers of the invention can contain, in addition to the amide complexes, other flame retardant compounds such as antimony oxide, zinc borate, tricresylphosphate, or alumina hydrate.

Both the metallic and amide portions of the complex present in the flame resistant polymers of the invention can be identified by relatively simple analytical methods. The method used for the metallic species is X-ray fluorescence spectroscopy. This method is discussed by I. M. Kolthoff, P. J. Elving, and E. B. Sandell in Treatise on Analytical Chemistry, vol. 5, John Wiley & Sons, New York (1964); particularly in Part 1, Section D–3, Chapter 60. It is also discussed by H. A. Liebhassky, X-ray Absorption and Emission in Analytical Chemistry, John Wiley and Sons, New York (1960).

The method used for the amide portion is mass spectroscopy. The flame retarded polymer is ground into a fine powder. A sample of the powder is placed in a sample tube in the mass spectrometer. The temperature of the sample probe is gradually raised until mass peaks are observed. The sample can be irradiated with from 15 to 80 e.v. and the amide identified by its fragmentation pattern and molecular ion. The American Petroleum Institue (API) reference spectro can be used to help in the analysis of the spectrum. API Reference Spectrum No. 1133 is for DMF.

The following examples will serve to further illustrate the invention. In these examples all percentages are weight percent. The HLT-15 flammability test method referred to is described by R. E. McMahon et al., 25th Annual Technical Conference (1970), Reinforced Plastics/Composites Division of the Society of the Plastics Industry, Inc., in Section 9–C, pages 1–12.

EXAMPLES 1–5

The complexes useful in the invention are synthesized by dissolving the metal halide in excess amide solvent. The excess solvent is then stripped at 80–100° C. and 1–10 mm. of mercury, leaving the crude residual complex. The complexes can be recrystallized or used in the crude form. The complexes, melting points, recrystallization solvent and infrared and nuclear magnetic resonance spectroscopic data are shown in Table I. Data on N,N-dimethylformamide, N,N-dimethylacetamide, and N-methylpyrrolidone are given for comparison.

TABLE I

| Example | Complex | M.P. | Recrystallization solvent | I.R. ($\nu$) C=O | I.R. ($\nu$) N—C=O | N.M.R. (p.p.m.) N—CH$_3$ | N.M.R. (p.p.m.) |
|---|---|---|---|---|---|---|---|
| 1 | ZnCl$_2$·2DMF | 113–114 | Cyclohexanone | 1,640 | 689 | 2.53  2.43 | O<br>$\parallel$<br>7.62 (HC—) |
| 2 | ZnCl$_2$·2DMAC | 115–117 | Dichloromethane | 1,599 | 745 | 3.20  3.10 | O<br>$\parallel$<br>2.40 (CH$_3$C—) |
| 3 | ZnCl$_2$·2NMP | 64–66 | Cyclohexanone | 1,630 |  | 2.99 | 3.58 (C$_5$H$_2$),[1] 2.82 and 1.85–2.45 (C$_3$H$_2$ and C$_4$H$_2$) |
| 4 | SnCl$_2$·1DMF | 67–69 | do | 1,635 | 675 | 3.25  3.08 | O<br>$\parallel$<br>8.40 (HC—) |
| 5 | SbCl$_3$·1DMF |  |  | 1,635 | ~660 | 3.18  3.00 | O<br>$\parallel$<br>8.18 (H—C—) |
|  | N,N-dimethylformamide |  |  | 1,660 |  | 2.53  2.43 | O<br>$\parallel$<br>7.62 (H—C—) |
|  | N,N-dimethylacetamide |  |  | 1,630 | 730 | 3.07  2.97 | O<br>$\parallel$<br>2.08 (CH$_3$C—) |
|  | N-methylpyrrolidone |  |  | 1,670 |  | 2.85 | 3.42 (C$_5$H$_2$) 2.55–1.62 (C$_3$H$_2$—C$_4$H$_2$) |

[1] Subscript on carbon indicates the ring position and not the number of carbons.

EXAMPLE 6

A flame retarded plasticized polyvinyl chloride film is made by mixing the following ingredients and casting them into a film.

| | Percent |
|---|---|
| Pliovic® S-51 (a polyvinyl chloride resin supplied by Goodyear Rubber Co.) | 25.0 |
| Dioctylphthalate | 17.5 |
| $SnCl_2 \cdot 1DMF$ | 2.7 |
| DMF | 54.8 |

The film cast from this solution is dried at 120° C. for 20 minutes. A slightly delustered, light yellow, flexible film is produced which is self-extinguishing, and nondripping in a vertical match test. A similar film without the $SnCl_2 \cdot 1DMF$ burns and drips in this test.

EXAMPLE 7

A flame retarded, plasticized polyvinyl chloride film is made by mixing the following ingredients, and casting them into a film.

| | Percent |
|---|---|
| Pliovic® S-51 | 25.2 |
| Dioctylphthalate | 17.6 |
| $SnCl_2 \cdot EDMF$ | 2.8 |
| Antimony (V) triglycoxide | 3.1 |
| DMF | 51.3 |

The film cast from this solution is dried at 120° C. for 20 minutes. A slightly delustered, light pink, flexible film is produced which is self-extinguishing, and nondripping in a vertical match test.

EXAMPLE 8

A flame retarded, plasticized polyvinyl chloride film is made by mixing the following ingredients, and casting them into a film.

| | Percent |
|---|---|
| Pliovac® S-51 | 25.0 |
| Tricresylphosphate | 17.5 |
| $SnCl_2 \cdot 1DMF$ | 2.7 |
| DMF | 54.8 |

The film cast from this solution is dried at 120° C. for 20 minutes. A lusrous, light yellow, flexible film is produced which is self-extinguishing and nondripping in a vertical match test.

EXAMPLE 9

A 8" x 7" x ⅛" polyester panel is made by mixing the following ingredients and hot pressing them.

| | Percent |
|---|---|
| Hetron® 23925 (a polyethylenechlorendate/styrene polyester supplied by Hooker Chemical Co.) | 94.4 |
| $ZnCl_2 \cdot 2DMF$ | 4.7 |
| Benzoyl peroxide | 1.0 |

The Hetron® 23925 resin and the $ZnCl_2 \cdot 2DMF$ are mixed for 30 minutes at 35–42° C., and then the benzoyl peroxide is added. The mixture is stirred for an additional 20 minutes before pouring it into a 8" x 7" x ⅛" mold at 45–50° C. The mold is placed in a hot press with 29,000 p.s.i. on the 2.56 in. diameter (6.50 cm.) piston, and heated according to the following schedule.

| Time, mins.: | Temperature |
|---|---|
| 15 | 79° C. (175° F.) |
| 20 | 107° C. (255° F.) |
| 20 | 135° C. (275° F.) |

The press is then cooled to 121° C. (250° F.) with air, and to 65° C. (149° F.) with water before removing the mold from the press.

The panel, which has fine $ZnCl_2 \cdot 2DMF$ crystals in it, is highly translucent, and has an HLT–15 flammability rating of 92.

A similar panel, without the $ZnCl_2 \cdot 2DMF$, is crystal clear and has an HLT–15 flammability rating of 76.

Another panel having hydrated zinc chloride in place of the $ZnCl_2 \cdot 2DMF$ is opaque, yellow and very weak.

EXAMPLE 10

A 8" x 7" x ⅛" polyester panel is made by mixing the following ingredients and hot pressing them.

| | Percent |
|---|---|
| Dion® FR6399 (a polyethylene-5-norbornene-2,3-dicarboxylate (partially brominated)-styrene supplied by Diamond Shamrock Co.) | 96.6 |
| $ZnCl_2 \cdot 2DMF$ | 2.4 |
| Benzoyl peroxide | 1.0 |

The ingredients are mixed and hot pressed according to the conditions described in Example 9. The resulting panel is crystal clear, and has an HLT–15 flammability rating of 100.

A similar panel without the $ZnCl_2 \cdot 2DMF$ is crystal clear, and has an HLT–15 flammability rating of 80.

Another panel having hydrated zinc chloride in place of the $ZnCl_2 \cdot 2DMF$ is red, tacky, and weak.

EXAMPLE 11

A 8" x 7" x ⅛" polyester panel is made by mixing the following ingredients and hot pressing them.

| | Percent |
|---|---|
| Hetron® 23925 | 94.2 |
| $ZnCl_2 \cdot 2DMF$ | 4.9 |
| Benzoyl peroxide | 1.0 |

The ingredients are mixed and hot pressed according to the conditions described in Example 9. The resulting panel is almost completely clear, and has an HLT–15 flammability rating of 85.

EXAMPLE 12

A 8" x 7" x ⅛" polyester panel is made according to Example 11 using Dion® FR6399 in place of the Hetron® 23925.

The resulting panel is almost completely clear and has an HLT–15 flammability rating of 100.

EXAMPLE 13

A 8" x 7" x ⅛" polyester panel is made by mixing the following ingredients and hot pressing them.

| | Percent |
|---|---|
| Hetron® 23925 | 91.7 |
| $ZnCl_2 \cdot 2NMP$ | 7.4 |
| Benzoyl peroxide | 0.9 |

The ingredients are mixed and hot pressed according to the conditions described in Example 9. The resulting panel is crystal clear and has an HLT–15 flammability rating of 92.

EXAMPLE 14

A 8" x 7" x ⅛" polyester panel is made by mixing the following ingredients and hot pressing them.

| | Percent |
|---|---|
| Dion® FR6399 | 96.2 |
| $ZnCl_2 \cdot 2NMP$ | 2.9 |
| Benzoyl peroxide | 1.0 |

The ingredients are mixed and hot pressed according to the conditions described in Example 9. The resulting panel is crystal clear and has an HLT–15 flammability rating of 100.

EXAMPLE 15

A 8" x 7" x ⅛" polyester panel is made by mixing the following ingredients and hot pressing them.

| | Percent |
|---|---|
| Hetron® 23925 | 93.4 |
| Antimony trioxide | 1.0 |
| $ZnCl_2 \cdot 2DMF$ | 4.7 |
| Benzoyl peroxide | 1.0 |

The antimony oxide and ZnCl$_2$·2DMF are added together to the resin. Otherwise, the mixing and hot pressing are according to the conditions described in Example 9. The resulting panel is opaque and has an HLT-15 rating of 100.

A similar panel without the antimony oxide has an HLT-15 flammability rating of 92. Another panel without the ZnCl$_2$·2DMF and containing 2% antimony oxide has an HLT-15 flammability rating of 84.

These data indicate a synergism between the antimony oxide and ZnCl$_2$·2DMF.

EXAMPLE 16

A 8" x 7" x ⅛" polyester panel is made by mixing the following ingredients and hot pressing them.

| | Percent |
|---|---|
| Dion® FR6399 | 93.5 |
| Antimony trioxide | 0.9 |
| ZnCl$_2$·2DMF | 4.7 |
| Benzoyl peroxide | 0.9 |

The ingredients were mixed and hot pressed according to the conditions described in Example 15. The resulting panel is opaque, and has an HLT-15 flammability rating of 100.

EXAMPLE 17

A 8" x 7" x ⅛" polyester panel is made by mixing the following ingredients and hot pressing them.

| | Percent |
|---|---|
| Hetron® 23925 | 92.5 |
| Antimony (V) triglycoxide | 1.9 |
| ZnCl$_2$·2DMF | 4.6 |
| Benzoyl peroxide | 0.9 |

The ingredients are mixed and hot pressed according to the conditions described in Example 15. The resulting panel is highly translucent and has an HLT-15 flammability rating of 100.

A similar panel without the antimony glycoxide has an HLT-15 flammability rating of 92. Another panel without the ZnCl$_2$·2DMF has an HLT-15 flammability rating of 60.

These data indicate a synergism between the antimony (V) triglycoxide and the ZnCl$_2$·2DMF.

EXAMPLE 18

A 8" x 7" x ⅛" polyester panel is made by mixing the following ingredients and hot pressing them.

| | Percent |
|---|---|
| Dion® FR6399 | 96.4 |
| ZnCl$_2$·2DMF | 2.4 |
| Antimony (V) triglycoxide | 0.3 |
| Benzoyl peroxide | 1.0 |

The ingredients are mixed and hot pressed according to the conditions described in Example 15. The resulting transparent panel is almost entirely free of crystals, and has an HLT-15 flammability rating of 100.

EXAMPLE 19

A 8" x 7" x ⅛" polyester panel is made by mixing the following ingredients and hot pressing them.

| | Percent |
|---|---|
| Dion® FR6399 | 95.2 |
| SbCl$_3$·1DMF | 2.8 |
| Benzoyl peroxide | 1.9 |

The ingredients are mixed and hot pressed according to the conditions described in Example 9. The resulting panel is crystal clear and has an HLT-15 flammability rating of 100.

EXAMPLE 20

A 8" x 7" x ⅛" polyester panel is made by mixing formulations A and B in a 1:1 ratio.

| Formulation A: | Percent |
|---|---|
| Hetron® 23925 | 89.3 |
| 8.9 ZnCl$_2$·2DMF | 8.9 |
| Benzoyl peroxide | 1.8 |

| Formulation B: | Percent |
|---|---|
| Hetron® 23925 | 99.6 |
| N,N-diethylaniline | 0.4 |

Formulations A and B are made by mixing the ingredients at 35° C. for ½ hour. Then the formulations are mixed together and placed in a 8" x 7" x ⅛" mold. In about ½ hour the mixture begins to gel, and the completed panel is removed from the mold in about 1 hour.

The resulting panel is similar to the one made in Example 9.

EXAMPLE 21

A 8" x 7" x ⅛" polyester panel is made by mixing the following ingredients and hot pressing them.

| | Percent |
|---|---|
| Dion® FR6399 | 96.2 |
| ZnCl$_2$·2-Urea | 2.9 |
| Benzoyl peroxide | 1.0 |

The ingredients are mixed and hot pressed according to the conditions described in Example 9. The resulting panel is highly translucent, although it contains some crystals. It has an HLT-15 flammability rating of 100.

What is claimed is:

1. A flame resistant composition of matter consisting essentially of a polymeric material selected from the group consisting of halogenated unsaturated polyester derived from a halogenated unsaturated polycarboxylic acid and a polyol and polyvinylchloride and from 0.5 to 30% by weight, based on said polymeric material, an amide complex of the formula:

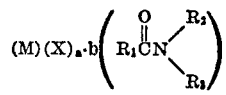

where
M is boron, aluminum, iron, zinc lead, tin or antimony;
X is chlorine, bromine, or iodine;
$a$ is an integer in the range of from 2-5 such that the salt MX is neutral;
R$_1$ is hydrogen, alkyl of 1-3 carbon atoms, or

where R$_4$ is hydrogen or alkyl of 1-3 carbon atoms and R$_5$ is hydrogen, alkyl of 1-3 carbon atoms, phenyl, bromo or chlorosubstituted phenyl;
R$_2$ and R$_3$ are each hydrogen or alkyl of 1-3 carbon atoms; and
$b$ is 1 or 2;
with the further proviso that R$_2$ and R$_3$ can be joined together to form the group —(CH$_2$)$_n$— wherein $n$=2-5 or can be taken together with the nitrogen atom (N) to form a morpholino group.

2. A composition of claim 1 wherein the polymeric material is a halogenated polyester.

3. A composition of claim 1 wherein the polymeric material is polyvinyl chloride.

4. A composition of claim 1 wherein the amide complex is ZnCl$_2$·2-dimethyl formamide.

5. A composition of claim 1 wherein the amide complex is SnCl$_2$·dimethyl formamide.

6. A composition of claim 1 wherein the amide complex is $ZnCl_2 \cdot 2(3,4\text{-dichlorophenyl-1,1-dimethylurea})$.

7. A composition of claim 1 wherein the polymeric material is a halogenated polyester, the amide complex is $ZnCl_2 \cdot b$-dimethyl formamide where b is 1 to 2, and the amount of amide complex is from 1 to 10% by weight based on the polymeric material.

8. A shaped article of the composition of claim 7.

9. A composition of claim 1 wherein the polymeric material is polyvinyl chloride, the amide complex is $MCl_2 \cdot b$-dimethyl formamide where M is Zn or Sn and b is 1 to 2, and the amount of amide is from 1 to 10% by weight based on the polymeric material.

10. A shaped article of the composition of claim 9.

References Cited

UNITED STATES PATENTS

| | | | |
|---|---|---|---|
| 1,867,658 | 7/1932 | Dreyfus | 117—136 |
| 2,838,424 | 6/1958 | Depew et al. | 117—137 |
| 3,239,482 | 3/1966 | Rapp | 260—45.75 |

DONALD E. CZAJA, Primary Examiner

V. P. HOKE, Assistant Examiner

U.S. Cl. X.R.

260—2.5 FP, 2.5 AJ, 45.75 K, 45.8 R, 45.8 N, 45.9R